UNITED STATES PATENT OFFICE.

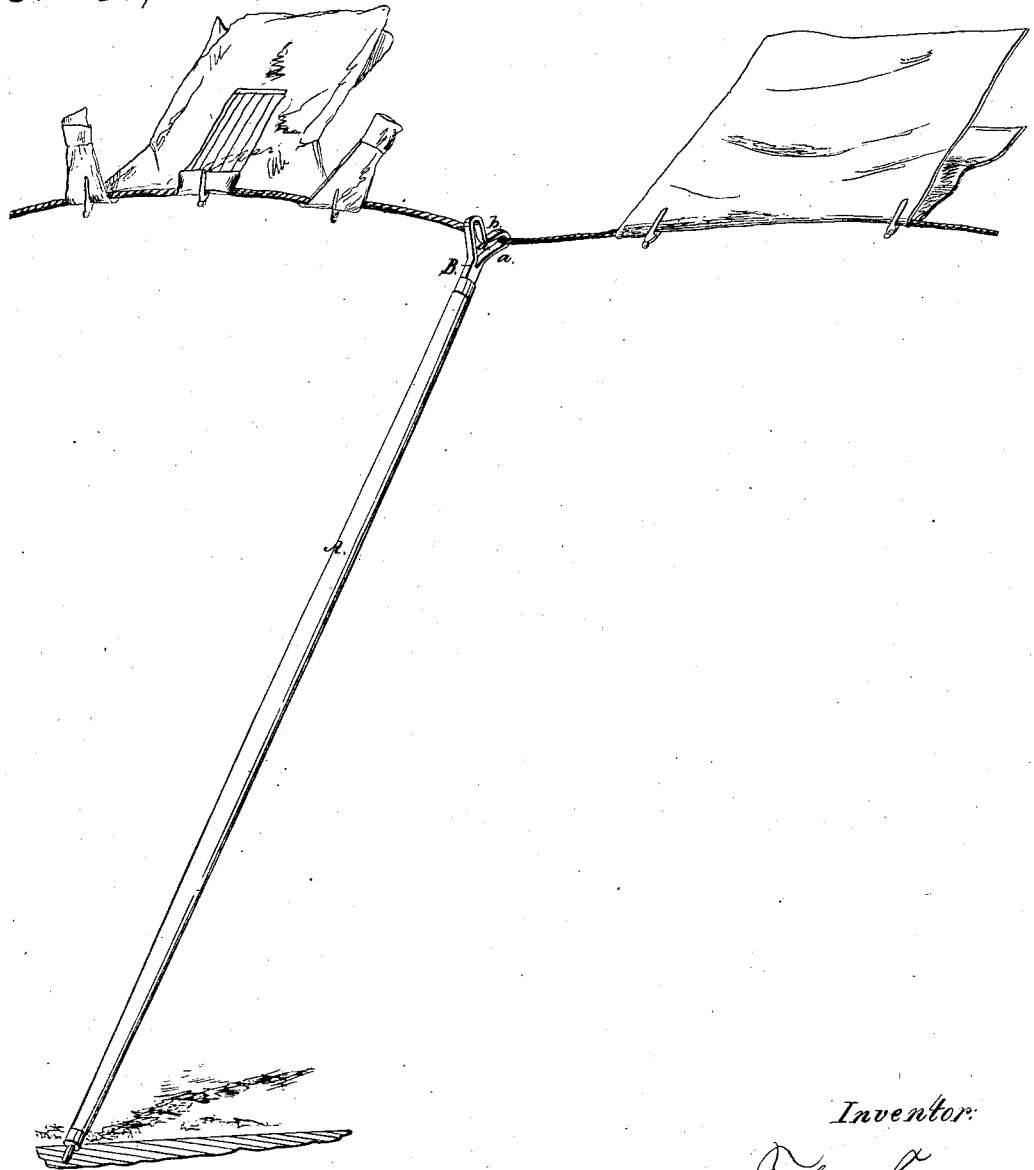

FRANCIS W. TILTON, OF NEW BEDFORD, MASSACHUSETTS.

IMPROVED CLOTHES-POLE.

Specification forming part of Letters Patent No. 55,744, dated June 19, 1866.

*To all whom it may concern:*

Be it known that I, FRANCIS W. TILTON, of New Bedford, in the county of Bristol and State of Massachusetts, have invented a new and Improved Clothes-Pole; and I do hereby declare that the following is a full, clear, and exact description thereof, which will enable others skilled in the art to make and use the same, reference being had to the accompanying drawing, forming part of this specification.

Much annoyance and a great deal of trouble is caused when clothes are hung upon lines by the lines sagging under the weight of the clothes, so as to cause the wet clothes to drag or trail upon the ground and become so much soiled as to require their removal from the lines to rinse them again. Hitherto the practice of preventing the lines sagging has been to drive two nails in the top of a pole and place the line between these nails. This may answer the purpose so far as the sagging of the line is concerned; but there is a greater embarrassment which this means does not overcome, namely, a slight gale of wind will draw the line away from between the nails, and on its subsiding the clothes invariably trail upon the ground.

The object, therefore, of my invention is to construct a clothes-pole so that it will not only support the line at the proper distance to keep the clothes from trailing on the ground, but will confine or hold the line securely, no matter how great may be the gale that would wrest the line from its grasp.

My invention consists in constructing a clothes-pole with a double-hooked end, so that the line can be readily inserted between the hooks and withdrawn at pleasure, and when placed thereon it will be firmly supported; and, also, in whatever direction the wind may blow, or how often it may shift, the line will always be in a position in the double hooks which will prevent it from becoming detached from the pole.

The accompanying drawing is a perspective view of my invention as applied to use.

A designates a pole, which may be of any suitable size and length, its lower end being provided with a spike for the more firmly securing it to the ground.

B designates the double hook. This, in detail, consists of two arms, $a\ a$, which rise from a common shank secured to the pole in any suitable manner. The arms are diverted from each other as they progress away from the pole, and then are bent inward toward each other, and in a downward direction, but so as not to touch each other, as shown at $b$.

Now it will be seen that the line can be readily pressed in between these hooks and can be readily withdrawn when desired. The line, when unaffected by the wind, will rest upon the top of the shank between the arms $a\ a$; but should the wind blow the clothes in either direction the line will slide up along the side of one of the arms and be caught in one of the hooks $b$, as shown clearly in the drawing.

My invention provides a simple and much needed device for use when clothes are hung upon lines, and accomplishes all that is required of it in a satisfactory manner.

What I claim as new, and desire to secure by Letters Patent, is—

A clothes-pole having one of its ends provided with a double hook, B, constructed substantially as shown and described.

FRANCIS W. TILTON.

Witnesses:
 JONATHAN SHERMAN, Jr.,
 JOB WADE.